March 15, 1932.  P. B. MOORE ET AL  1,849,947

WINDSHIELD VENTILATOR

Filed June 29, 1929

Inventors
Paul B. Moore
and Bennett Lewis

By Bacon & Thomas
Attorneys

Patented Mar. 15, 1932

1,849,947

UNITED STATES PATENT OFFICE

PAUL B. MOORE AND BENNETT LEWIS, OF INDIANAPOLIS, INDIANA, ASSIGNORS TO MARTIN-PARRY CORPORATION, OF YORK, PENNSYLVANIA, A CORPORATION OF DELAWARE

WINDSHIELD VENTILATOR

Application filed June 29, 1929. Serial No. 374,639.

This invention relates to windshield ventilators, and more particularly to the type adapted to be mounted adjacent the windshield of an automobile having a body of the closed or convertible type, for the purpose of supplying auxiliary ventilation for the interior of the car.

It is the general object of the invention to simplify and improve the construction and operation of devices of this character, to render them economical in manufacture and foolproof in operation.

One of the specific objects of the invention is to provide an improved frictional mounting for the ventilator by which it may be held frictionally in open, closed, or adjusted positions.

Other objects and features of novelty will be apparent as the following description proceeds, as taken in connection with the accompanying drawings forming a part of this specification, in which.

Figure 1:
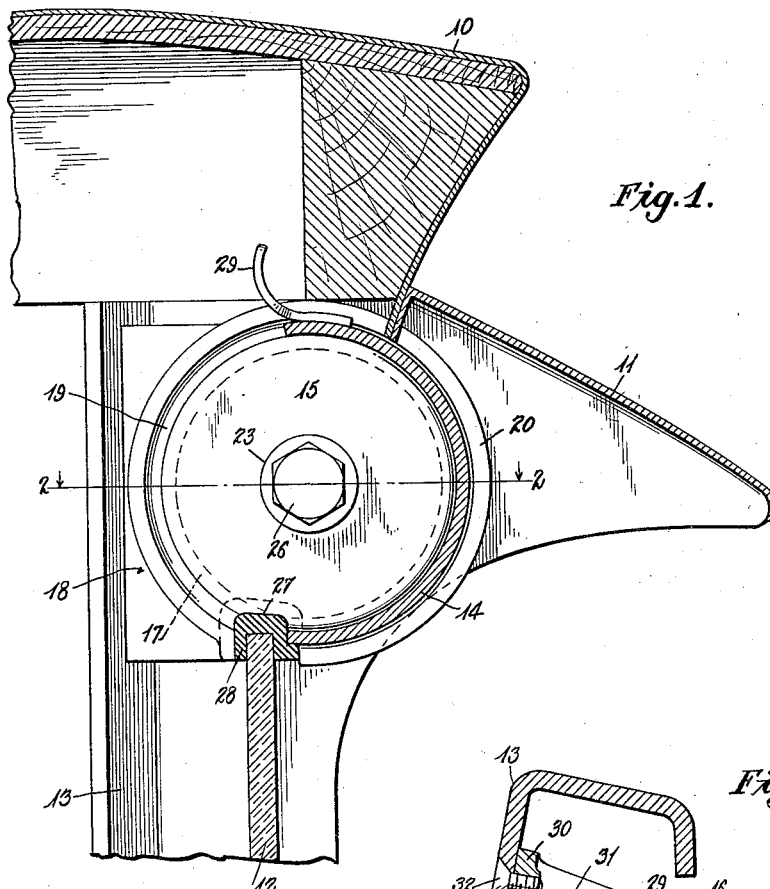
Fig. 1 is a vertical section, partly in elevation showing the ventilator as mounted near the top, and under the visor of an automobile, according to one embodiment of the invention.

Referring more particularly to the drawings, certain characteristic elements of automobile bodies have been shown in order to clarify the illustration of the novel features of the invention with relation thereto. These elements are the top 10, the visor 11, windshield 12 and body windshield pillar 13, which are constructed with relation to each other in the manner customary in the art, with the exception that the windshield 12, while it may be exactly like the usual windshield, is preferably terminated a little short of its usual position, thus leaving room between the windshield and the top for the mounting of the ventilator.

The ventilator comprises essentially a semi-cylindrical member 14 constructed of glass, fiber, metal, or other suitable material and may be opaque or transparent as desired. End members 15 are provided at each end of the ventilator 14 and provide means for pivotally supporting the ventilator from studs 16.

In the preferred form of the invention shown, the member 15 is disc-like with an outwardly directed annular flange 17 which fits inside the other end of the ventilator 14 and is rigidly secured thereto. Obviously this specific form is not essential as the fundamental purpose of the member 15 is to provide a pivotal support for the ventilator 14.

For mounting the ventilator on the car body, brackets 18 are secured to body windshield pillars 13, or other stationary portions of the body and provide a support for the studs 16. In the preferred form shown, the bracket 18 comprises a substantially flat circular portion 19 having an annular flange 20 of a diameter large enough to receive the ventilator 14 and form a shield for the ends thereof. The stud 16 is preferably mounted in the center of curvature of the flange 20.

Friction means of similar construction are provided at each end of the ventilator for holding said ventilator 14 in desired positions of adjustment and means associated therewith for automatically taking up wear and for anti-rattling purposes. The central portion of the member 15 is dished to form a concave, substantially spherical seat 21, in the center of which is provided aperture 22, of slightly larger diameter than the stud 16 which pivotally supports the ventilator. An annular bearing member or collar 23 is provided with a spherical portion 24 mating with the seat 21. A helical spring 25 is interposed between the member 23 and the head 26 of the stud 16 and normally urges the member 23 against its seat.

Referring again to Fig. 1, it will be noted that in the embodiment shown, the upper rail 27 of the windshield is provided with the rubber gasket 28 and that the stud 16 is located to one side of the plane of the windshield and well above the rail 27. The arrangement is such that the lower edge of the ventilator 14 buts against the rubber gasket 28 when the ventilator is in the closed position shown in Fig. 1. A pull clip 29 is provided on the upper edge of the ventilator in a position where it may be grasped by the operator.

It will be apparent that merely grasping the pull clip 29 and pulling it downward will pivot the ventilator and cause the lower edge thereof to swing upwardly away from the gasket 28 and provide a ventilation opening for the interior of the car.

Figure 2:
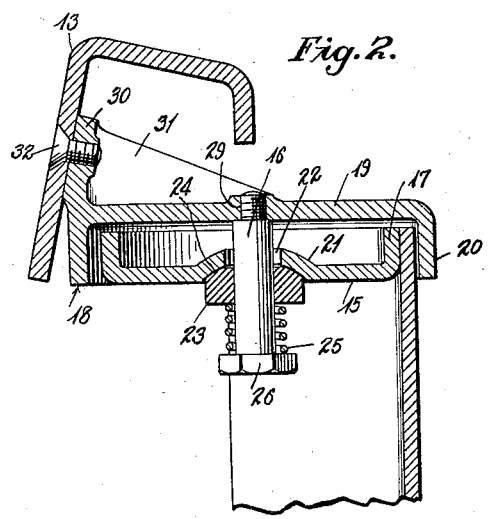
Fig. 2 is a horizontal cross section taken along the line 2—2 of Fig. 1.
Figure 3:
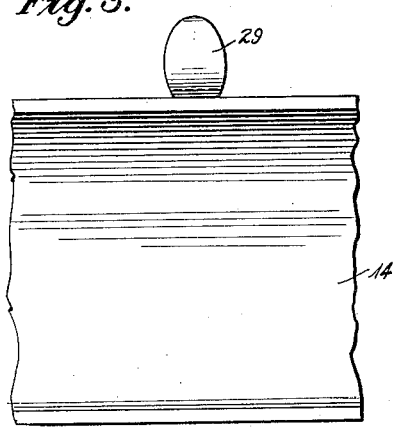
Fig. 3 is a fragmentary elevational view of the intermediate portion of the ventilator member.

The member 15 which supports the ventilator will pivot about its seat on the bearing member 23 which is yieldingly held thereagainst by the spring 25. The strength of the spring is such as to hold the ventilator in any desired position of adjustment and also prevent rattling of the moving parts. It will be understood that with a spring 25 at each end of the ventilator, the use of springs of as near equal strength as possible will result in the centering of the ventilator between the opposite brackets 18 so that the end members 15 will be held out of contact with the flat circular portions 19 of the said brackets, as best illustrated in Fig. 2, to prevent rattling. The use of the spherical surface 24, on the bearing member 23, with a similarly shaped surface on the seat 21, and the provision of an aperture 22 of greater diameter than the diameter of the stud 16 will enable the mating spherical surfaces to center the end members 15 with respect to the studs 16 and will take all of the wear off of the studs and receive it on the relatively large spherical surfaces.

It will be noted that the ventilator body 14 is connected at its opposite ends to the side pillars 13 of the windshield by means of yieldable connections; namely, the springs 25 bearing against the heads 26 of the studs 16 and the bearing members 23. This mounting for the ventilator permits the latter to be adjusted relative to the brackets 18 carried by the pillars 13. This type of mounting for the ventilator body enables the same to take care of any weaving strains resulting from relative movement of the windshield pillars 13.

In the drawings the bracket 18 has been shown in great detail with the studs 16 threaded thereinto as at 29 and the bracket is provided with a flange 30 strengthened by a web 31 and secured to the supporting structure by machine screws 32. Obviously the broader idea of the invention is not limited to the specific details shown and described, but includes such embodiments of the invention as fall within the scope of the subjoined claims.

Having thus described the invention what we claim as new and desire to secure by Letters Patent of the United States is:

1. In combination with a windshield ventilator of the type adapted to be pivotally supported between the top of a closed car body and the windshield proper, a pair of brackets secured to stationary parts of the car body carrying pivot members for supporting the respective ends of the ventilator, and spring pressed friction means for yieldably centering said ventilator between said brackets and holding it in various positions of adjustment.

2. In combination with a windshield ventilator of the type adapted to be pivotally supported between the top of a closed car body and the windshield proper, a pair of brackets secured to stationary parts of the car body carrying pivot members for supporting the respective ends of the ventilator, and spring pressed friction means for holding said ventilator in various positions of adjustment and centering it with respect to said pivot members, said brackets being provided with annular flanges adapted to overlie the ends of said ventilator and arranged concentrically and out of contact with the latter.

3. Apparatus of the character described, comprising in combination, a pair of opposed brackets carrying pivot members horizontally aligned, a windshield ventilator having its ends respectively loosely mounted on said pivot members, and spring pressed means for retarding the movement of said ventilator about said pivot and for centering the ventilator axially with respect to the brackets and radially with respect to the pivot members.

4. Apparatus of the character described, comprising in combination, a semi-cylindrical windshield ventilator, a circular member fitted in the ends of said ventilator for supporting it about a pivot, a stationary bracket carrying a stud forming the pivot for said end member, and friction means for retarding the motion of said member about the stud, said friction means including a spherical seat formed on the end member and a spring pressed bearing member having a spherical surface mating with said seat.

5. A device of the character described, for pivotally supporting a semi-cylindrical windshield ventilator from a stationary support, comprising in combination an end member secured to one end of said ventilator having a central aperture, a bracket supporting a stud of less diameter than and passing through said aperture, said member being dished in the region of said aperture to provide a spherical seat, an apertured bearing member mounted on said stud for axial movement only and having a spherical surface mating with said seat, a helical spring mounted on said stud having one end bearing against the head thereof and the other end bearing against said apertured bearing member for normally urging it against its seat.

6. The combination with a vehicle body including a top, a pair of windshield pillars depending from opposite sides of the top, and a windshield glass fitted between said pillars and terminating at its upper edge in spaced relation from said top to form a ventilator opening, of a pocketed bracket mounted on each pillar within said opening, a trough-shaped ventilator body having a straight lower longitudinal edge pivotally mounted on said brackets with its ends received in the pockets of said brackets, means associated with said body and brackets for centering the body relative the brackets, and a weather stripping member carried by the upper edge of the windshield glass against which the lower longitudinal edge of the ventilator body bears when the ventilator is in its closed position.

7. In combination with a windshield ventilator pivotally mounted at its opposite ends on the windshield pillars and adapted to swing in one direction to open the ventilator, means for operating the ventilator, and friction means associated with at least one of said pivot mountings for holding the ventilator in adjusted positions, said friction means also serving to take care of weaving strains transmitted to said ventilator by relative movement between said pillars.

8. In combination with a windshield ventilator, adapted to swing outwardly from the plane of the windshield on pivots secured to the side pillars of the windshield, means for operating the ventilator, and means at one end of the ventilator for taking care of weaving strains caused by relative movement between said pillars, comprising complementary dished friction surfaces associated with the windshield ventilator pivot.

9. In combination, a glass windshield, a weatherstripping member carried by the upper edge of said windshield, supports at the opposite ends of the windshield, a bracket secured to each support, a trough-shaped ventilator body pivotally mounted on said brackets to move about an axis positioned above the upper edge of said windshield and having a straight longitudinal edge adapted to bear against the weatherstripping member when said body is in its closed position, and means operatively associated with the ends of the ventilator body and the brackets for holding the ventilator in adjusted positions and also serving to center the said body between said brackets.

In testimony whereof we affix our signatures.

PAUL B. MOORE.
BENNETT LEWIS.